United States Patent [19]
Morse

[11] Patent Number: 6,016,149
[45] Date of Patent: Jan. 18, 2000

[54] LIGHTING UNIT FOR A THREE-DIMENSIONAL GRAPHICS ACCELERATOR WITH IMPROVED PROCESSING OF MULTIPLE LIGHT SOURCES

[75] Inventor: Wayne Morse, Fremont, Calif.

[73] Assignee: Sun Microsystems, Inc., Palo Alto, Calif.

[21] Appl. No.: 08/884,687

[22] Filed: Jun. 30, 1997

[51] Int. Cl.$^7$ .................................................. G06T 15/50
[52] U.S. Cl. ............................................................. 345/426
[58] Field of Search ............................ 345/425, 426–432

[56] References Cited

U.S. PATENT DOCUMENTS

| | | | |
|---|---|---|---|
| 4,866,637 | 9/1989 | Gonzalez-Lopez et al. | 345/426 |
| 4,901,064 | 2/1990 | Deering . | |
| 5,517,611 | 5/1996 | Deering . | |

*Primary Examiner*—Mark R. Powell
*Assistant Examiner*—Thu Nguyen
*Attorney, Agent, or Firm*—Conley, Rose & Tayon; Jeffrey C. Hood

[57] ABSTRACT

A lighting unit for improved processing of multiple light sources. The lighting unit includes an input buffer for receiving one or more attributes corresponding to a given polygon. The lighting unit further includes a first light parameter storage location for storing a first set of light parameters for a first light source illuminating the given polygon, and a second light parameter storage location for storing a second set of light parameters for a second light source illuminating the given polygon. Still further, the lighting unit includes a first light type storage location which stores a lighting routine index for the first light source, and a second light type storage location which stores a lighting routine index for the second light source. The first light type storage location is initialized to be a current light type storage location. The lighting routine indices point to a particular lighting routine to be performed for a given type of light source. The lighting unit finally includes a control unit configured to execute a next light instruction. The next light instruction comprises accessing the current light type storage location to obtain the first lighting routine index. The next light instruction further comprises updating the current light type storage location to be the second light type storage location in preparation for a subsequent execution of the next light instruction. The control unit is further configured to effectuate performing a first lighting routine specified by the first lighting routine index.

28 Claims, 7 Drawing Sheets

Computer

6,016,149

LIGHTING UNIT FOR A THREE-DIMENSIONAL GRAPHICS ACCELERATOR WITH IMPROVED PROCESSING OF MULTIPLE LIGHT SOURCES

FIELD OF THE INVENTION

The present invention relates to a 3-D graphics accelerator, and more particularly to a lighting core for a 3-D graphics accelerator which exhibits improved processing of multiple light sources.

DESCRIPTION OF THE RELATED ART

A three-dimensional (3-D) graphics accelerator is a specialized graphics rendering subsystem for a computer system which is designed to off-load the 3-D rendering functions from the host processor, thus providing improved system performance. In a system with a 3-D graphics accelerator, an application program executing on the host processor of the computer system generates three-dimensional geometry data that defines three-dimensional graphics elements for output on a display device. The application program causes the host processor to transfer the geometry data to the graphics accelerator. The graphics accelerator receives the geometry data and renders the corresponding graphics elements on the display device.

The design architecture of a high performance three-dimensional graphics system historically embodies a balance between increasing system performance and minimizing system cost. However, prior graphics systems usually suffer from either limited performance or high cost due to a variety of system constraints.

Applications which display three-dimensional graphics require a tremendous amount of processing capabilities. For example, for a computer system to generate smooth 3-D motion video, the computer system is required to maintain a frame rate or update rate of between 20 to 30 frames per second. This requires a 3-D computer graphics accelerator capable of processing over a million triangles per second.

One architectural approach to increasing performance of 3-D graphics systems is through the use of algorithm specific circuits, dedicated to just one stage of a graphics pipeline. This trend started many years ago at the bottom end of the graphics pipeline with pixel processing functions, and gradually moved up to span interpolation, edge interpolation, and more recently, setup functions. Other functions performed earlier in the pipeline (such as transformation, clipping, and lighting) have generally been performed by more expensive general purpose floating-point processors, such as DSP chips or special microcoded floating-point hardware.

Increasingly, however, operations such as lighting are beginning to dominate computation time, particularly with the use of more complex lighting models. In order to achieve greater visual realism, users of graphics standards such as XGL and OpenGL routinely use multiple light sources with specular highlights, not just a single diffuse light. The use of multiple light sources, however, leads to increased complexity of control logic (either hard-wired or microcoded), thereby limiting performance of the graphics accelerator in performing lighting calculations.

Consider a given geometric primitive transferred to a graphics accelerator. In order to perform lighting computations for a primitive (thereby calculating its color values), the cumulative effect of each of a possible plurality of light sources is considered. Each of the plurality of light sources typically has different properties which necessitate different processing. For example, a light source may either be an "infinite" light or a "directional" light. Infinite light sources are modeled as uniformly illuminating a given object, while directional light sources, which emanate from a single point, are modeled as illuminating different portions of the object with varying brightness, depending on direction and distance to the directional light source. Typical prior art systems include microcode routines for handling common combinations of types and number of light sources. For example, a particular microcode routine may be written to handle the case of two infinite lights for an object. Another routine may be written to handle the case of one infinite light and one directional light for an object, etc. Because a large number of light sources (of varying types) are allowable, however, this leads to a correspondingly large number of microcode lighting routines. This results in increased microcode storage requirements, as well as making the process of routine optimization more difficult.

Other prior art lighting units process multiple light sources one at a time. These systems still suffer from inefficiency in switching between light sources, however. For example, memory accesses are performed by the lighting unit in order to determine the next type of light source to be processed and parameters which correspond to the next light source. These memory accesses result in a delay between finishing processing of one light source and commencing processing of a subsequent light source, thereby limiting system performance.

A lighting unit is therefore desired which provides increased performance for handling of multiple light sources.

SUMMARY OF THE INVENTION

The present invention comprises a lighting unit for improved processing of multiple light sources. The lighting unit includes an input buffer for receiving one or more attributes corresponding to a given polygon. These attributes may include color, normal, and position data. The lighting unit further includes a plurality of light parameter storage locations, e.g. a first light parameter storage location for storing a first set of light parameters for a first light source which illuminates the given polygon and a second light parameter storage location for storing a second set of light parameters for a second light source illuminating the given polygon. These parameter locations include attributes (such as light direction) which are predefined according to a particular graphics standard.

Still further, the lighting unit includes a plurality of light type storage locations, e.g. a first light type storage location which stores a lighting routine index for the first light source, and a second light type storage location which stores a lighting routine index for the second light source. The lighting routine indices point to a particular lighting routine to be performed for a given type of light source. In the preferred embodiment, the lighting routine index specifies an infinite light, a directional light, or an exit routine indicating there are no more active lights for a given primitive. The first light type storage location is initialized to be a current light type storage locations.

The lighting unit finally includes a control unit configured to execute a next light instruction. The next light instruction comprises accessing the current light type storage location to obtain the first lighting routine index. The next light instruction further comprises updating the current light type storage location to be the second light type storage location in preparation for a subsequent execution of the next light instruction. The control unit is further configured to effectuate performing a first lighting routine specified by the first lighting routine index. The first lighting routine uses the attributes corresponding to the given polygon and the first set of light parameters to generate one or more intermediate color values.

By employing the first and second light parameter storage locations, as well as the first and second light type storage locations, attributes of a plurality of light sources may be defined before commencement of actual lighting computations. These storage locations are quickly accessible by the lighting unit, and thus allow for low-overhead transitions between different light sources. Lighting performance is therefore advantageously increased. A more efficient microcode implementation is also achieved by reducing the number of lighting routines.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE EMBODIMENTS

Figure 1:
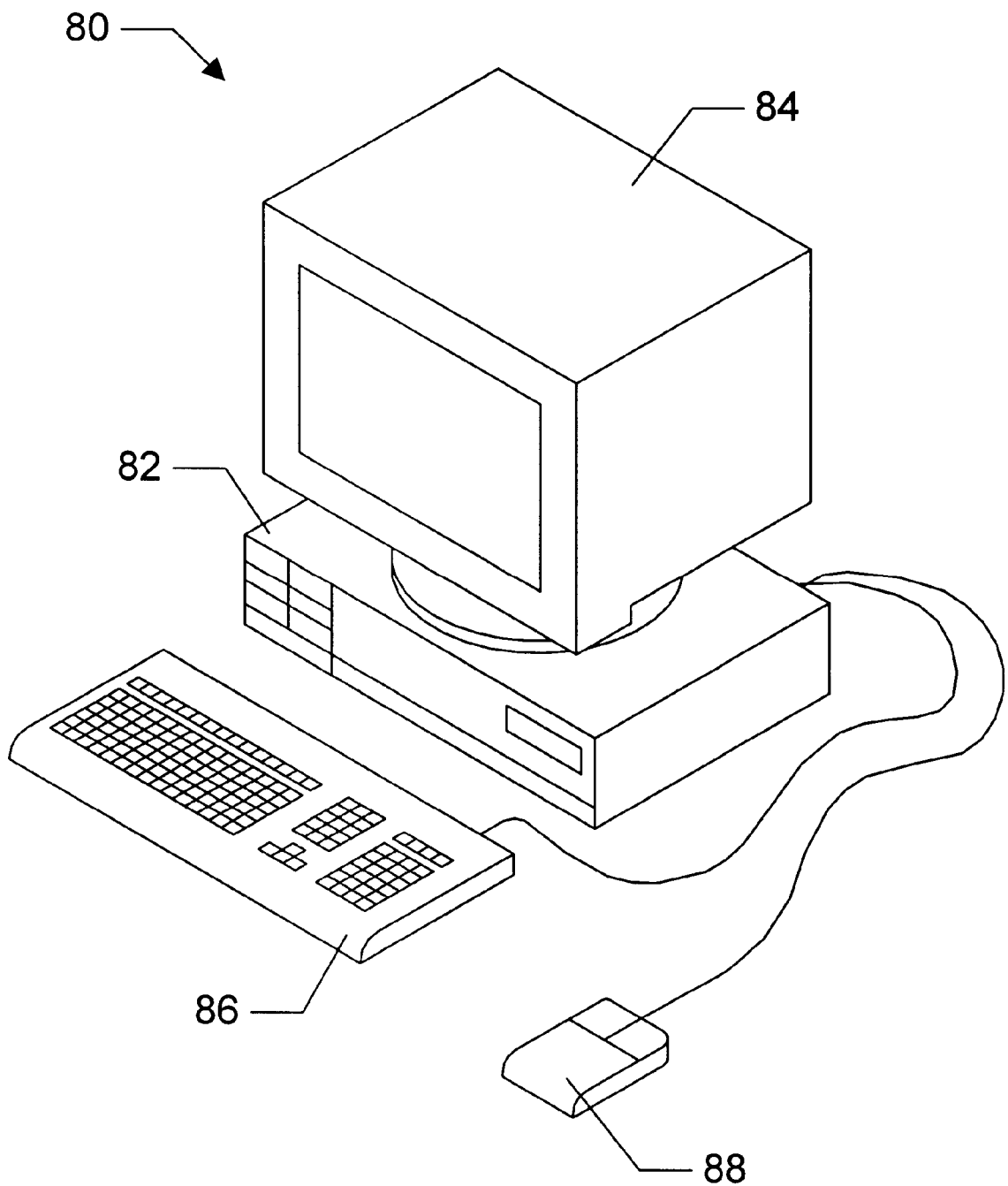
FIG. 1 illustrates a computer system which includes a three-dimensional (3-D) graphics accelerator according to the present invention.

FIG. 1—Computer System

Referring now to FIG. 1, a computer system 80 which includes a three-dimensional (3-D) graphics accelerator according to the present invention is shown. As shown, the computer system 80 comprises a system unit 82 and a video monitor or display device 84 coupled to the system unit 82. The display device 84 may be any of various types of display monitors or devices. Various input devices may be connected to the computer system, including a keyboard 86 and/or a mouse 88, or other input. Application software may be executed by the computer system 80 to display 3-D graphical objects on the video monitor 84. As described further below, the 3-D graphics accelerator in computer system 80 includes a lighting unit which exhibits increased performance for processing of multiple light sources illuminating three-dimensional graphical objects rendered on display device 84.

Figure 2:
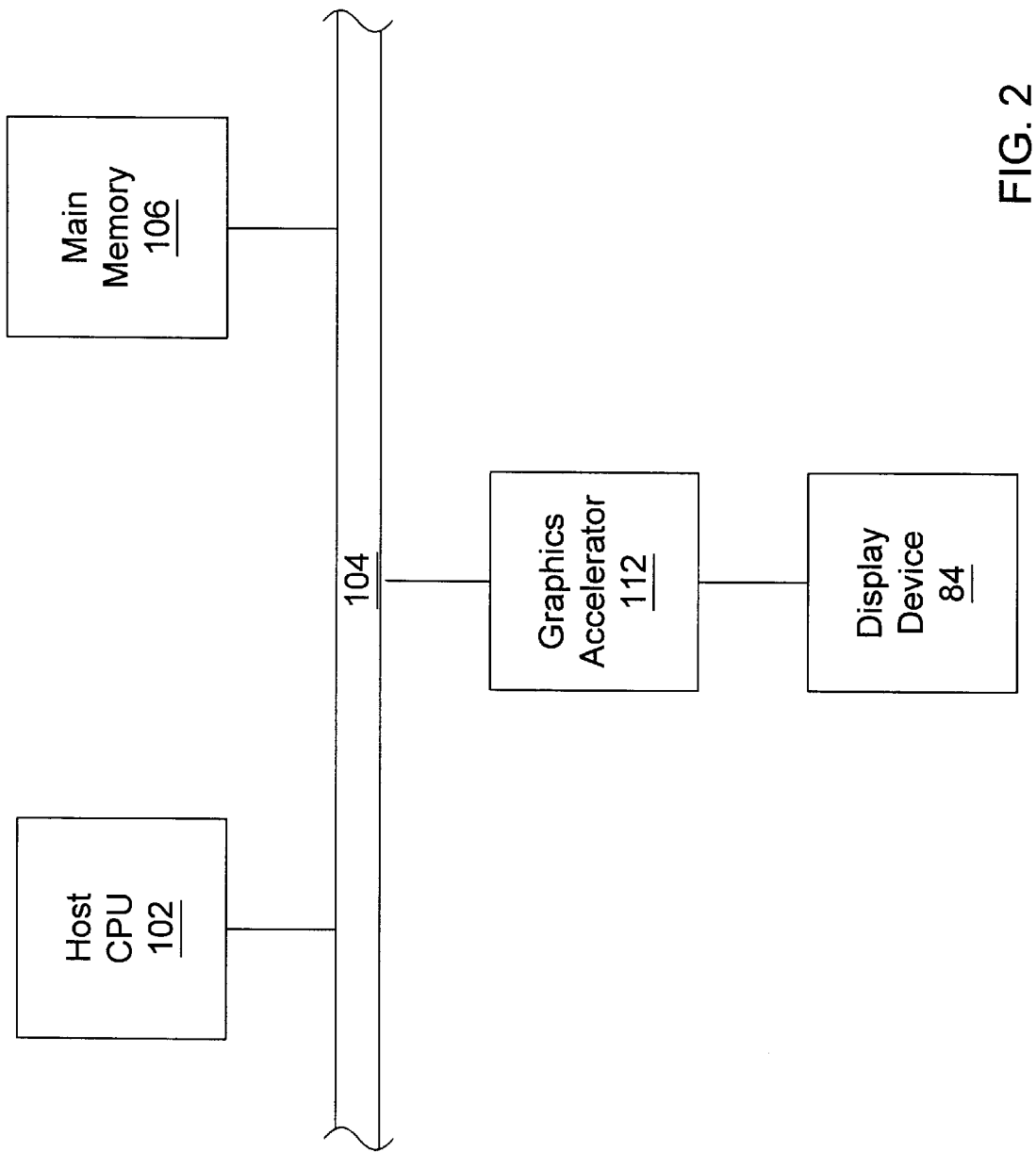
FIG. 2 is a simplified block diagram of the computer system of FIG. 1.

FIG. 2—Computer System Block Diagram

Referring now to FIG. 2, a simplified block diagram illustrating the computer system of FIG. 1 is shown. Elements of the computer system which are not necessary for an understanding of the present invention are not shown for convenience. As shown, the computer system 80 includes a central processing unit (CPU) 102 coupled to a high speed bus or system bus 104. A system memory 106 is also preferably coupled to the high speed bus 104.

The host processor 102 may be any of various types of computer processors, multi-processors and CPUs. The system memory 106 may be any of various types of memory subsystems, including random access memories and mass storage devices. The system bus or host bus 104 may be any of various types of communication or host computer buses for communication between host processors, CPUs, and memory subsystems, as well as specialized subsystems. In the preferred embodiment, the host bus 104 is the UPA bus, which is a 64 bit bus operating at 83 MHz.

A 3-D graphics accelerator 112 according to the present invention is coupled to the high speed memory bus 104. The 3-D graphics accelerator 112 may be coupled to the bus 104 by, for example, a cross bar switch or other bus connectivity logic. It is assumed that various other peripheral devices, or other buses, may be connected to the high speed memory bus 104, as is well known in the art. It is noted that the 3-D graphics accelerator may be coupled to any of various buses, as desired. As shown, the video monitor or display device 84 connects to the 3-D graphics accelerator 112.

The host processor 102 may transfer information to and from the graphics accelerator 112 according to a programmed input/output (I/O) protocol over the host bus 104. Alternately, the graphics accelerator 112 accesses the memory subsystem 106 according to a direct memory access (DMA) protocol or through intelligent bus mastering.

A graphics application program conforming to an application programmer interface (API) such as OpenGL generates commands and data that define a geometric primitive such as a polygon for output on display device 84. As defined by the particular graphics interface used, these primitives may be modeled as being illuminated by multiple light sources. Host processor 102 transfers commands and data relating to these primitives (and corresponding light sources) to memory subsystem 106. Thereafter, the host processor 102 operates to transfer the primitive/light source data to the graphics accelerator 112 over the host bus 104. Alternatively, the graphics accelerator 112 reads in data using DMA access cycles over the host bus 104. In another embodiment, the graphics accelerator 112 is coupled to the system memory 106 through a direct port, such as the Advanced Graphics Port (AGP) promulgated by Intel Corporation. As will be described below, graphics accelerator 112 is advantageously a light type pointer for each of a plurality of light sources, resulting in increased performance for processing of multiple light sources as specified by host processor 102.

Figure 3:
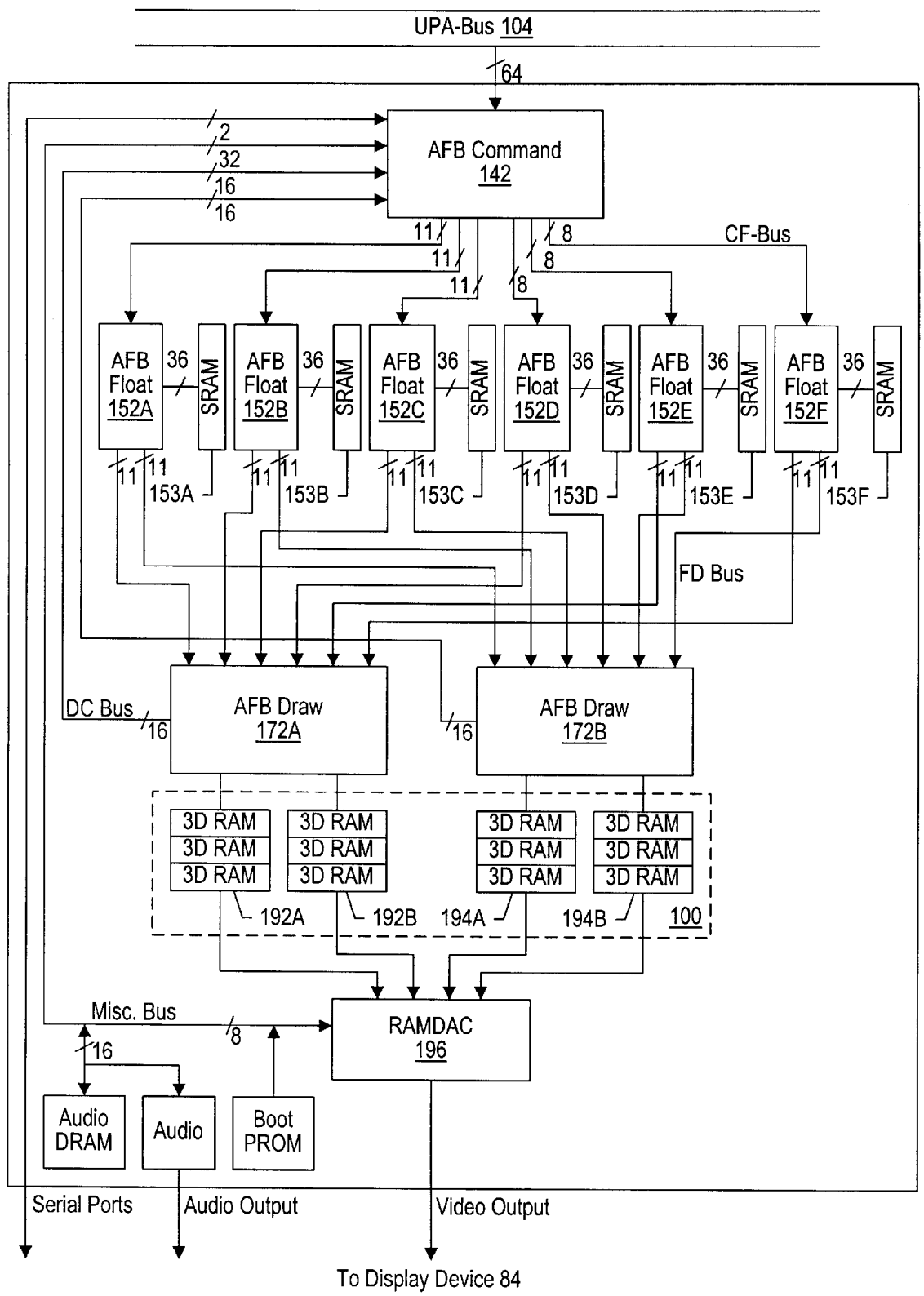
FIG. 3 is a block diagram illustrating the 3-D graphics accelerator according to the preferred embodiment of the present invention.

FIG. 3—Graphics Accelerator

Referring now to FIG. 3, a block diagram is shown illustrating the graphics accelerator 112 according to the preferred embodiment of the present invention. As shown, the graphics accelerator 112 is principally comprised of a command block 142, a set of floating-point processors 152A–152F, a set of draw processors 172A and 172B, a frame buffer 100 comprised of 3DRAM, and a random access memory/digital-to-analog converter (RAMDAC) 196.

As shown, the graphics accelerator 112 includes command block 142 which interfaces to the memory bus 104. The command block 142 interfaces the graphics accelerator 112 to the host bus 104 and controls the transfer of data between other blocks or chips in the graphics accelerator 112. The command block 142 also pre-processes triangle and vector data and performs geometry data decompression.

The command block 142 interfaces to a plurality of floating point blocks 152. The graphics accelerator 112 preferably includes up to six floating point processors labeled 152A–152F, as shown. The floating point processors 152A–152F receive high level drawing commands and generate graphics primitives, such as triangles, lines, etc. for rendering three-dimensional objects on the screen. The floating point processors 152A–152F perform transformation, clipping, face determination, lighting and set-up operations on received geometry data. Each of the floating point processors 152A–152F connects to a respective memory 153A–153F. The memories 153A–153F are preferably 32 k×36-bit SRAM and are used for microcode and data storage.

Each of the floating point blocks 152A–F connects to each of two draw processors 172A and 172B. The graphics accelerator 112 preferably includes two draw processors 172A and 172B, although a greater or lesser number may be used. The draw processors 172A and 172B perform screen space rendering of the various graphics primitives and operate to sequence or fill the completed pixels into the 3DRAM array. The draw processors 172A and 172B also function as 3DRAM control chips for the frame buffer 100. The draw processors 172A and 172B concurrently render an image into the frame buffer 100 according to a draw packet received from one of the floating-point processors 152A–152F, or according to a direct port packet received from the command processor 142.

Each of the floating point blocks 152A–F preferably operates to broadcast the same data to the two drawing blocks 172A and 172B. In other words, the same data is always on both sets of data lines coming from each floating point block 152. Thus, when the floating point block 152A transfers data, the floating point block 152A transfers the same data over both parts of the FD-bus to the draw processors 172A and 172B.

Each of the respective drawing blocks 172A and 172B couple to frame buffer 100, wherein frame buffer 100 comprises four banks of 3DRAM memory 192A–B, and 194A–B. The draw processor 172A couples to the two 3DRAM banks 192A and 192B, and the draw processor 172B couples to the two 3DRAM banks 194A and 194B, respectively. Each bank comprises three 3DRAM chips, as shown. The 3DRAM memories or banks 192A–B and 194A–B collectively form the frame buffer 100, which is 1280×1024 by 96 bits deep. The frame buffer stores pixels corresponding to 3-D objects which are rendered by the draw processors 172A and 172B.

Each of the 3DRAM memories 192A–B and 194A–B couple to a RAMDAC (random access memory digital-to-analog converter) 196. The RAMDAC 196 comprises a programmable video timing generator and programmable pixel clock synthesizer, along with cross-bar functions, as well as traditional color look-up tables and triple video DAC circuits. The RAMDAC in turn couples to the video monitor 84.

The command block is preferably implemented as a single chip. Each of the floating point processors 152 are preferably implemented as separate chips. In the preferred embodiment, up to six floating point blocks or chips 152A–F may be included. Each of the drawing blocks or processors 172A and 172B also preferably comprise separate chips. For more information on different aspects of the graphics accelerator architecture of the preferred embodiment, please see related co-pending application Ser. No. 08/673,492 entitled "Three-Dimensional Graphics Accelerator With Direct Data Channels for Improved Performance", and related co-pending application Ser. No. 08/673,491 entitled "Three-Dimensional Graphics Accelerator Which Implements Multiple Logical Buses Using Common Data Lines for Improved Bus Communication", both filed on Jul. 1, 1996.

As described above, command block 142 interfaces with host bus 104 to receive graphics commands and data from host CPU 102. These commands and data (including polygons illuminated by a plurality of light sources) are passed in turn to floating point processors 152 for transformation, lighting, and setup calculations. The general operation of these floating point processors 152, which are advantageously configured for improved processing of multiple light sources, is described with reference to FIG. 4. The L-core block within floating point processors 152, which provides this improved processing capability, is described with reference to FIGS. 5–7.

Figure 4:
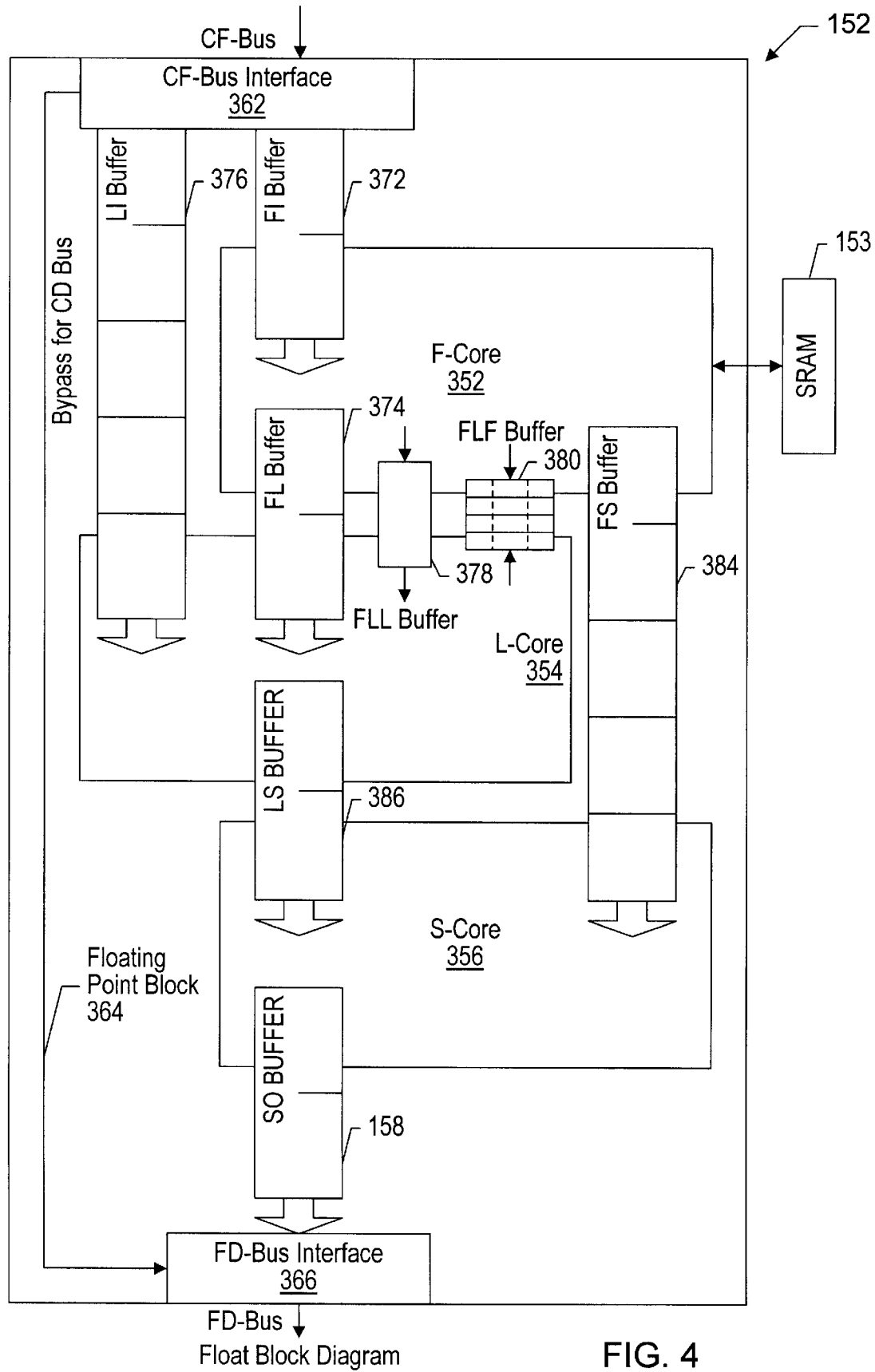
FIG. 4 is a block diagram illustrating one of the floating point processors in the 3-D graphics accelerator according to the preferred embodiment of the present invention.

FIG. 4—Floating Point Processor Block Diagram

Referring now to FIG. 4, a block diagram illustrating one of the floating point processors 152 according to the preferred embodiment of the present invention is shown. Each of the respective floating point processors 152A–152F are identical, and thus only one is described here for convenience. As shown, each of the floating point blocks 152 includes three main functional units or core processors, these being F-core 352, L-core 354, and S-core 356. The F-core block 352 is coupled to receive data from the CF-bus transferred from the Command block 142. The F-core block 352 provides output data to each of the L-core block 354 and the S-core block 356. The L-core block 354 also provides data to the S-core block 356. The S-core block 356 provides output data to the FD bus.

The F-core block 352 performs all floating point intensive operations, including geometry transformation, clip testing, face determination, perspective division, and screen space conversion. The F-core block 352 also performs clipping when required. In the preferred embodiment, the F-core block 352 is fully programmable, using a 36-bit micro instruction word stored in a 32 k word SRAM.

The L-core block 354 performs most lighting calculations using on-chip RAM-based microcode. The L-core block 354 also includes an efficient triple-word design for more efficient lighting calculations. This triple-word design operates with a 48-bit data word comprising 16-bit fixed point values. Thus one instruction can perform the same function on all three color components (RGB) or all three components of a normal ($N_x$, $N_y$, and $N_z$) in one cycle. The math units comprised in the L-core block 354 automatically clamp values to the allowed ranges, thus requiring no additional branches.

The S-core block performs setup calculations for all primitives. These set-up calculations involve computing the distances in multiple dimensions from one vertex to another and calculating slopes along that edge. For triangles, the slopes of the Z depth, the color, and the UV (for texture) are also computed in the direction of a scan line.

As shown, each of the floating point blocks 152 includes CF-bus interface logic 362 which couples to the CF-bus. Each of the floating point blocks 152 includes FD-bus interface logic 366 which couples to the FD-bus. Each floating point block 152 includes a bypass bus or data path 364 which serves as the data transfer path through a respective floating point block 152 for the CD bus. Data which is sent over the CD bus, i.e., which is sent directly to the FD bus, travels on the data transfer bus 364, thus bypassing the floating point logic comprised in the floating point block 152.

In general, data which is provided to the floating point block 152 can have one of three destinations, these being the F-core block 352, the L-core block 354, or directly out to the FD bus, i.e., a CD bus transfer. In the preferred embodiment, data which is destined for the F-core block 352 comprises 32-bit words, including 32-bit IEEE floating point numbers and other 32-bit data. Data destined for the L-core block 354 comprises 48-bit words comprising three 16-bit fixed point numbers.

As shown, the floating point block 152 includes a float input buffer (FI buffer) 372 which receives data from the CF-bus which was provided by the command block 142. The FI buffer 372 is double-buffered and holds 32 32-bit entries in each buffer. The first word, word zero, stored in the FI buffer 372 comprises an opcode which informs the F-core block 352 which microcode routine to dispatch for the received geometric primitives. Only the header and X, Y and Z coordinates are provided to this buffer when transforming and lighting geometric primitives.

The floating point block 152 also includes an F-core to L-core buffer (FL buffer) 374. The FL buffer 374 is double buffered and holds 16 16-bit entries in each buffer. The F-core block 352 operates to write or combine three F-core words into one L-core word which is provided to the FL buffer 374. From the L-core perspective, each buffer in the FL buffer 374 appears as five 48-bit entries. During lighting operations, three X, Y, Z coordinates are sent from the F-core block 352 through the FL buffer 374 to the L-core block 354. These three X, Y, Z coordinates are used to compute eye direction.

The floating point block 152 includes an L-core input buffer (LI buffer) 376 which receives data sent across the CF-bus which was provided from the command block 142 and provides this data to the L-core block 354. The LI buffer 376 comprises five buffers, each of which hold seven 48-bit entries. These seven 48-bit entries comprise three vertex normals, three vertex colors and one word with three alpha values. The FI buffer 372 and the LI buffer 376 collectively comprise the floating point block input buffer.

The floating point block 152 also includes an FLL buffer 378, which connects between the F-core block 352 and the L-core block 354. The FLL buffer 378 is a FIFO used for transmitting lighting and attenuation factors from the F-core block 352 to the L-core block 354. These attenuation factors comprise three X,Y,Z position values, three attenuation values, three ambient light values, and one attenuation shift word containing three packed values. An FLF buffer 380 is also provided between the F-core block 352 and the L-core block 354. The FLF buffer is a bi-directional buffer used for communicating data between the F-core block 352 and the L-core block 354 under F-core control.

An L-core to S-core buffer (LS buffer) 386 is coupled between the L-core block 354 and the S-core block 356. The LS buffer 386 is double-buffered with each buffer holding four 48-bit words.

The floating point block 152 also includes an F-core to S-core buffer (FS buffer) 384 which is used for transferring data from the F-core block 352 to the S-core block 356. The FS buffer comprises five buffers which each hold 32 32-bit values. These five buffers are designed to match the pipeline stages of the L-core block 354, these being the two FL buffers, the two LS buffers, plus one primitive which may be stored in the L-core block 354. Data transferred from the F-core block 352 through this buffer to the S-core block 356 includes a dispatch code that indicates which microcode procedure to run in the S-core block 356.

Finally, the floating point block 152 includes an S-core output buffer (SO buffer) 158 which is coupled between the S-core block 356 and the FD bus interface 366. The SO buffer 158 collects data to be sent across the FD bus to the respective draw processors 172A–172B. The SO buffer 158 is double buffered and holds 32 32-bit words in each buffer. The SO buffer 158 holds up to two primitives comprising fixed point data in the order needed by the respective draw processors 172A–172B. S-core block 356 conveys additional status information along with the fixed point data to draw processors 172. For example, a status bit is conveyed with each entry indicating whether or not a given primitive is the last of a group of related primitives. The SO buffer 158 includes a separate status register which indicates how many words are valid so that the minimum number of cycles are used to transfer the data across the bus. The SO buffer 158 comprises the floating point block output buffer 158.

Figure 5:
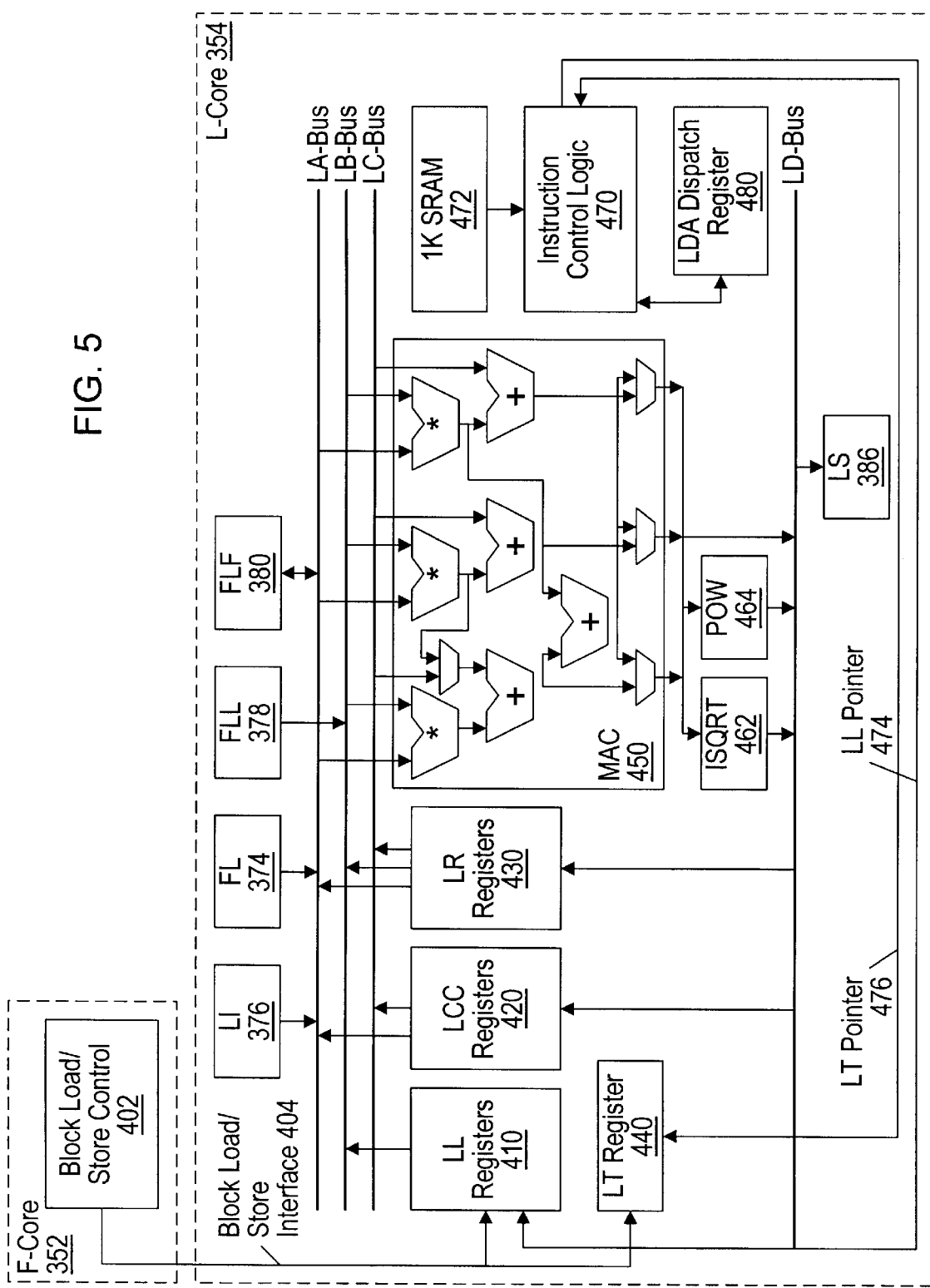
FIG. 5 is a block diagram illustrating the L-Core block (and relevant F-core interface) in the preferred embodiment of the present invention.

FIG. 5—L-Core Block Diagram

Referring now to FIG. 5, a block diagram illustrating the L-Core block 354 in each of the floating point processors 152 is shown. The relevant interface to F-core block 352 is also shown. The L-core block 354 comprises a fixed point computational unit for performing lighting computations. In order to set up multiple light processing, block load/store control unit 402 within F-core block 352 conveys light parameter information and light type information to L-core block 354 via block load/store interface bus 404. Light parameter information is stored in a light attribute (LL) register file 410, while light type information is stored in light type (LT) register 440. These registers are described further with reference to FIGS. 7A and 7B.

Additional information is conveyed to L-core block 354 via FL buffer 374, FLL buffer 378, and FLF buffer 380. In addition to LL register 410, L-core block 354 includes an LCC (color value) register file 420, and a LR (general purpose) register file 430. Operands are conveyed from register files 410, 420, and 430 to an LA-bus, an LB-bus, and an LC-bus to a multiply-accumulate block 450 for lighting computations. These computations are performed under control of instruction control logic block 470, executing microcode stored in an SRAM 472. Additional lighting computations are performed in an inverse square root (ISQRT) block 462 and a power function unit 464. Lighting results are conveyed on an LD-bus, and conveyed to S-core block 356 via LS buffer 386.

The L-core processor 354 is specifically designed to perform lighting calculations. In the preferred embodiment, the L-core block 354 performs most of the lighting operations. The F-core block 352 performs lighting computations for more complex light sources which require the use of a general purpose floating point processor, such as point and spot light sources.

In the preferred embodiment, all calculations in L-core block 354 are performed using 16-bit fixed-point math, three at a time. The three values in a 48-bit word may either represent one triple such as XYZ, normal, or RGB, or may represent a value (e.g., an alpha value) for each three different vertices of a triangle. The lighting computation performed by L-core 354 does not use pre-multiplied material color with other lighting attribute's cached values. This allows the graphics accelerator to support RGB per-vertex color triangle meshes as a high quality alternative to texture and bump mapping. In general, most lighting operations are expected to include a per vertex color change. While this requires some increased computation in the L-Core 354, it is completely overlapped by other units (i.e., L-Core is still faster than both F-Core and S-Core). This change also makes it much easier to support OpenGL's semantics, in which colors might change at any vertex without warning and without any effective way of caching.

The L-Core 354 has efficient 16-bit function units and also performs the model space to world space transformation on vertex normals. The command block 142 delivers normal data to the floating point processor 152 as 48-bit values (3 16-bit components), already normalized. The L-Core registers include two 3×3 normal transformation matrices, stored as three 48-bit values each. The two transformation matrices are used to perform left and right eye transformations in stereo mode.

Colors and normals are transferred from the command block 142 to L-Core 354 by way of the LI-Buffer 376. The lighting calculations are performed in response to microcode instructions residing in SRAM 472 and executing under control of instruction control logic 470 and a dispatch word passed in from F-core block 352. The L-Core instruction set does not include branch instructions, so each step of the lighting calculation runs to completion, then the next step is started based on the contents of the next dispatch word.

The L-Core 354 includes three different register files in addition to the input and output buffers. The LL registers 410 contain the values for each of up to 32 lights. LT register 440 specifies which light to access, since only one light may be accessed at a time. The light values are loaded by F-Core 352 and are not modified by L-Core 354. The LR registers 430 are used as general purpose registers for storing intermediate values from the lighting computations. The LCC registers 420 hold the material properties or "current color" values for primitive vertices.

L-Core block 354 includes multiply-accumulate block 450, including one unit for each of the three 16-bit values in the 48-bit word. Standard operation of each of the multiply-accumulate units is 48 bits in and 48 bits out. For the dot product calculation, there is only a 16-bit result, so this result is replicated into each of the three 16-bit fields.

Inverse square root (ISQRT) block 462 is used in normalizing the viewpoint vector. The ISQRT block 462 receives 16 bits from a dot product calculation and produces a 16-bit result, replicated to three values in the 48-bit word. Furthermore, the L-Core 354 also includes a power function unit 464 which is used for computing specular highlights. The power function unit 464 also takes in 16 bits from a dot product calculation and produces a 16-bit result, replicated to three values in the 48-bit word. The power function unit 464 performs two table lookups and performs other calculations to produce an accurate value. The result is accurate to 0.5%, or accurate to a least significant bit of an 8-bit color.

L-Core Communication Buffers

The L-Core 354 includes five different buffers for communicating with other parts of the chip. The LI Buffer 376 corresponds to the Fl buffer 372 in F-Core block 352. The LI Buffer 376 is used for accessing incoming data from command block 142 coming across the CF-Bus. The LI Buffer 376 appears as seven 48-bit registers and contains three colors, three normals, and one word containing the three alpha values. Like the FS registers 384 in F-Core 352, the LI buffer 376 comprises five buffers to match up with the two FI Buffers 372, the two FL buffers 374, plus the one primitive that is being processed in F-Core 352.

The FL Buffer 374 is used to receive the XYZ viewpoint vector from F-Core 352. The FL Buffer 374 is also used to store clipped RGB color and alpha values when necessary. The FLL FIFO 378 is used for passing attenuation values for local lights. These values require floating-point computations that may only be performed in F-Core 352. When the lighting calculations get to the point where the attenuation factor is needed for a light, L-Core 354 pauses until the data is available in the FLL FIFO 378.

The FLF Buffer 380 is for communication between L-Core and F-Core and is not intended for normal operation. One run-time use of the FLF buffer 380 is to send lighting values back to L-Core 354 during clipping and for F-Core to "borrow" the power function logic from L-Core 354 for use with spot lights. To do this, F-Core writes the two power function parameters to the FLF buffer 380, then interrupts L-core and requests that the computation be performed. When computations are complete, the result is placed back into the FLF buffer 380 and L-Core 354 is allowed to continue. F-Core 352 then reads the result out of its side of the FLF buffer 380. The FLF buffer 380 is also used for diagnostic purposes.

The LS Buffer 386 comprises the write-only output registers used to send data to S-Core 356 for setup computations. Only colors and alpha values are sent across this interface. For standard triangles, three colors and one alpha word (containing three values) are sent to S-Core 356. In the preferred embodiment, the LS Buffer 386 comprises four double-buffered entries.

Figure 6:
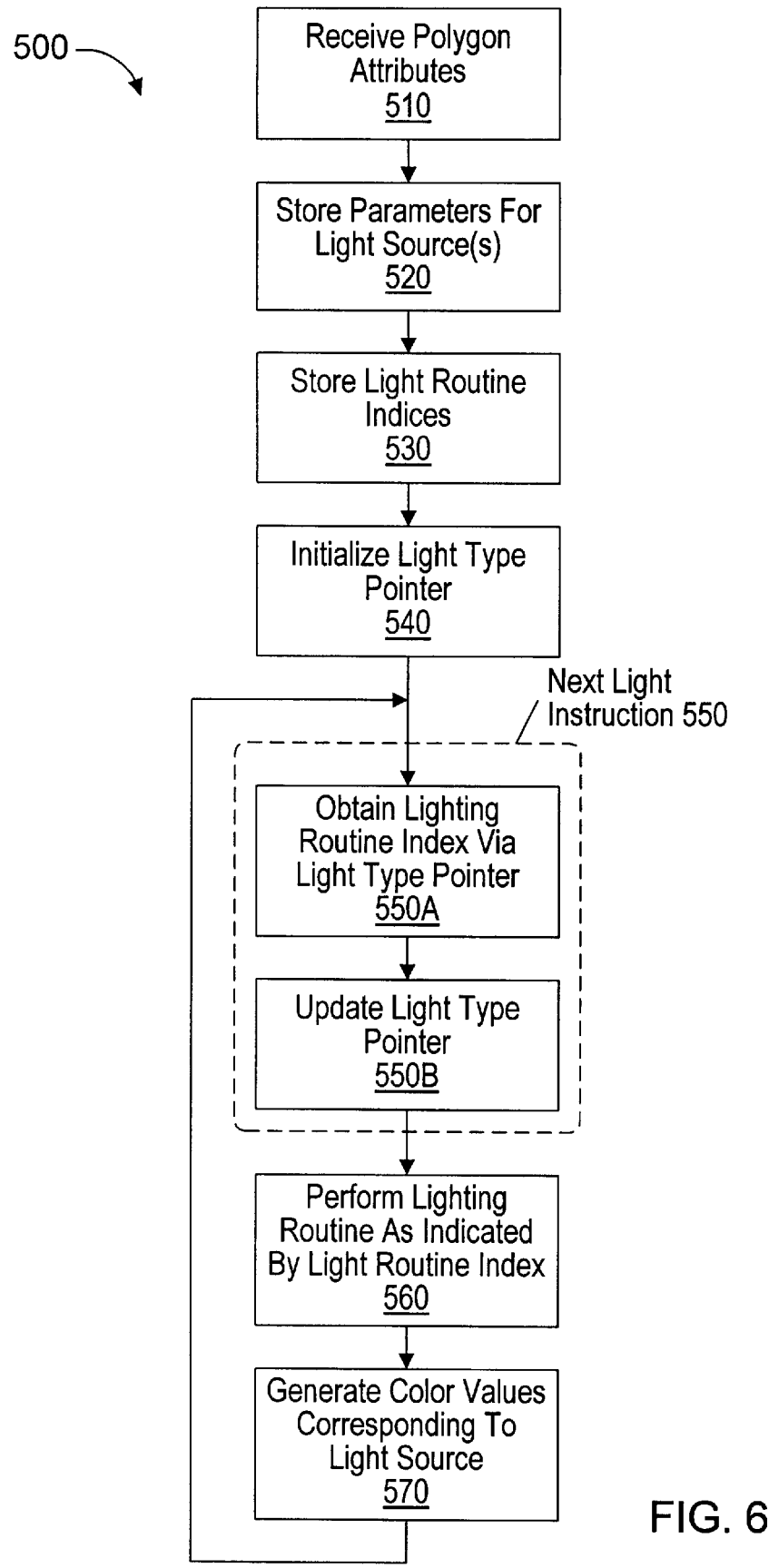
FIG. 6 is a flowchart illustrating one method of multiple light source processing in the preferred embodiment of the present invention.

FIG. 6—Multiple Light Source Processing

Referring now to FIG. 6, a flowchart is shown illustrating one embodiment of a method for processing multiple light sources in a lighting unit within a graphics accelerator. Method 500 represents the preferred embodiment of the present invention.

In step 510, attributes relating to the polygon on which lighting computations are to be performed are received by L-core block 352. In one embodiment, these attributes include color, normal, and position data. LI buffer 376 stores color and normal data transferred by command block 142, while FL buffer 374 includes XYZ position data transformed by F-core block 352.

In step 520, F-core block 352 stores parameters corresponding to each of one or more light sources which illuminate the polygon defined by the attributes received in step 510. These parameters are transferred to LL register file 410 under control of block load/store control unit 402 via block load/store interface bus 404. In one embodiment, LL register file 410 includes 32 groups of four registers each. Each group of four registers corresponds to a different light source, and includes parameters used to perform lighting calculations as defined by a given graphics standard. In the preferred embodiment, the four registers within each of the 32 groups store light direction, the pre-computed half vector, the diffuse light color, and the specular light color. In alternate embodiments, differing light source parameters (as well as differing numbers of light sources) may be stored. As will be described below, only one of the groups of LL registers is addressable by L-core 352 microcode (via LL pointer 474) during a given clock cycle.

In step 530, F-core block 352 pre-loads LT register 440 for each of the one or more light sources loaded in step 520. As in step 520, this data is loaded via block load/store interface bus 404. In one embodiment, LT register 440 includes two bits for each of the 32 light sources definable in LL register file 410. For each light source, these two bits indicate a) the light source is an infinite light source b) the light source is a directional light source or c) there are no more active light sources. Differing numbers of bits may be used in alternate embodiments to point to additional processing routines (texture mapping routines, for example). In the preferred embodiment, instruction control logic 470 addresses two bits of LT register 440 at a time via LT pointer 476.

In one embodiment, the two-bit field for each light source specifies a particular register within LDA dispatch register block 480. Registers 480 each contain an entry point address for a particular microcode routine. Registers 480 are preloaded within the appropriate addresses by block load/store control unit 402 of F-core block 352 via block load/store interface bus 404 before light source processing commences.

In an alternate embodiment, steps 520 and 530 may be reversed, with the light type data being loaded into LT register 440 prior to loading light parameters into LL register file 410. In another embodiment, registers 410 and 440 may be written concurrently on separate buses. These registers are, however, loaded before lighting computations commence. L-core block 354 achieves increased performance by loading registers 410 and 440 prior to execution and using pointer logic to quickly transition between processing of different light sources.

In step 540, LT pointer 476 is initialized to point to the first location within LT register 440. In one embodiment, this initialization is performed by a "lmcmb" instruction which sets a dispatch bit in a status register within L-core block 354. The "lmcmb" instruction is stored in SRAM 472 and is executed under control of instruction control logic 470. This instruction also resets LL pointer 474 in one embodiment to point to the first group of 4 registers within LL register file 410. LT pointer 476 (and LL pointer 474) may also be initialized in a variety of other ways.

Subsequent to steps 510, 520, 530, and 540 being performed, L-core block 354 is now prepared to perform lighting computations. In step 550, a "next light" instruction is issued by instruction control logic 470. In sub-step 550A, LT register 440 is accessed to obtain the lighting routine index for the current light source. In one embodiment, a particular field of LT register 440 may be read according to the current value of LT pointer 476. In an alternate embodiment, a working copy of LT register 440 is made on the first execution of the next light instruction for a given primitive. Subsequent next light instructions modify this working copy as described below. In either case, a two-bit lighting routine index is obtained from LT register 440 corresponding to the current light source.

In sub-step 550B, LT pointer 476 (or, alternately, the working copy of LT register 440) is updated in preparation for the next execution of a next light instruction. In one embodiment, the current value of LT pointer 476 is saved, while the pointer itself is updated to point to the next two-bit field. In an embodiment in which a working copy of LT register 440 is made, the working copy is shifted (either left or right, depending on the organization of LT register 440) two bits, with the two bits shifted out of register 440 saved for a subsequent jump instruction. The two most significant bits of the shifted version of register 440 now specify the lighting routine index of the next light source. In one embodiment, LL pointer 474 is also updated to point to the next group of four registers.

In either case, the two-bit lighting routine index specifies the lighting routine to be performed for the current light source. This index is used to point to a particular dispatch register in LDA dispatch register block 480 according to the type of light source processing desired. If a light source is modeled as being an infinite light source, a two-bit value is pre-stored in LT register 440 which points to a particular location in LDA dispatch register block 480. The particular location in block 480 contains the address of a corresponding microcode routine in SRAM 472 which performs infinite light processing. Corresponding registers in block 480 also exist for the directional light microcode routine address as well as the address of the exit routine.

In step 560, instruction control logic 470 jumps to an address in SRAM 472 specified by the address in register block 480. A lighting routine as specified by LT register 440 is thereby performed for the current light source. In step 570, L-core block 354 uses the color/normal/position data in buffers 374 and 376 and the light parameters in register file 410 to calculate intermediate lighting results which are stored in general purpose LR register file 430. In one embodiment, only one group of LL registers 410 (as specified by LL pointer 474) is addressable by the microcode at a given time. Since only one light is processed by L-core block 354 at a time, fewer microcoded lighting routines (two, in the preferred embodiment) are needed. This results in a smaller amount of microcode storage being required.

Once a lighting routine is complete, another next light instruction is executed. The current field in register 440 is retrieved. If another light source is specified for the current primitive, the appropriate lighting routine is dispatched by control logic 470 as described above. L-core block 354 performs lighting calculations for a particular polygon until an exit routine is specified in LT register 440. When the two-bit exit code is encountered, post-processing of results is performed, and final color values are conveyed to S-core block 356 via LS buffer 386.

As described above, F-core block 352 may "borrow" the power function block 464 within L-core block 354 by means of an interrupt. It is noted that in one embodiment of the present invention, this interrupt may be serviced between processing of multiple light sources. For example, a power function interrupt request from F-core block 352 may be signaled to L-core block 354 during processing of a first light source. After completion of the lighting routine for the first light source, the power function interrupt is serviced, with results written to FLF buffer 380. Execution then resumes within L-core block 354 with processing of a second light source. For each light that requires power function logic 464, F-core block 352 borrows this logic from L-core block 354 during lighting calculations.

Figure 7A:
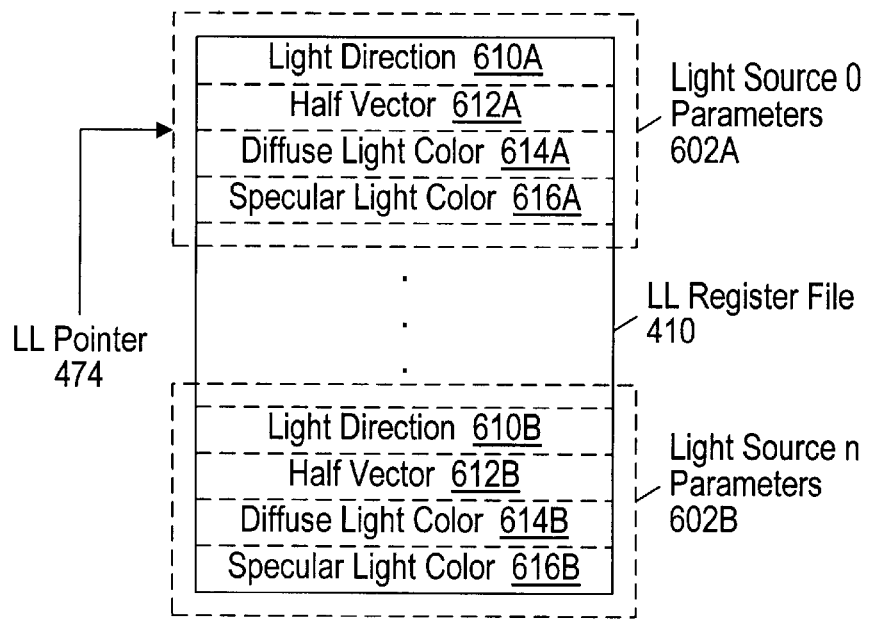
FIGS. 7A and 7B illustrate the light parameter register file and light type register in the preferred embodiment of the present invention.
Figure 7B:
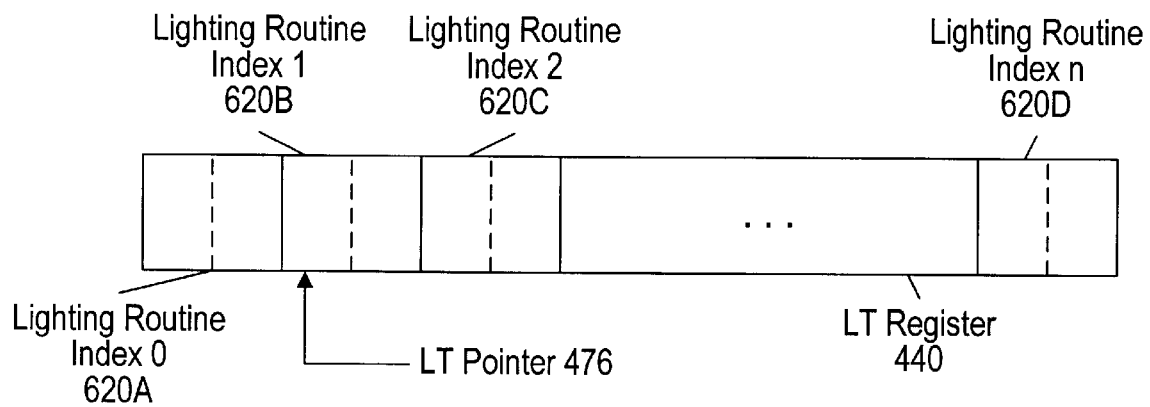

FIGS. 7A and 7B—LL Registers and LT Register

Referring now to FIG. 7A, an exploded view is shown of LL register file 410. As depicted, LL register file 410 includes light source parameters 602A and 602B. Light source parameter 602A is for a light source 0, while light source parameter 602B is for a light source n. In the preferred embodiment, n is 32. All parameter groups 602 may not be defined for a particular primitive. For example, a given polygon may be illuminated by three different light sources. In such a case, 29 of the 32 groups 602 within LL register file 410 are unused. LL pointer 474 points to one of the n groups of light source parameters 602. Each group within register file 410 includes storage locations for four predefined parameters: light direction 610, half vector 612, diffuse light color 614, and specular color 616. In alternate embodiments, more or less light parameters may be defined according to a particular graphics API. The contents of LL register file 410 may be collectively referred to herein as a table of light source parameters.

Referring now to FIG. 7B, an exploded view is shown of LT register 440. As illustrated, LT register file 440 includes lighting routine indices 620A–D. Lighting routine index 620A is for light source 0, 620B for light source 1, etc. In one embodiment, each index 620 is a two-bit field which specifies a particular lighting routine. One possible encoding of this two-bit field is shown in Table 1 below.

Lighting Specified

TABLE 1

| Routine Index Bits | Microcode Routine |
|---|---|
| 00 | Not used |
| 01 | Directional Light |
| 10 | Infinite Light |
| 11 | No more lights; Exit Routine |

As with register file 410, all the fields of LT register 440 may not be used for a given primitive. For a polygon illuminated by three light sources, three fields in LT register 440 specify the type of light source (be it infinite or directional), while a fourth indicates an exit condition. The remaining 28 fields are unused. By predefining light source parameters and types, the actual lighting calculations may be performed more quickly since light source attributes (and the number of light sources) are stored in locations that are quickly accessible to control logic 470. The contents of the LT register may be collectively referred to herein as a lighting map.

In the embodiment shown in FIG. 7B, the most significant bits of LT register 440 are on the right hand side of the register. It is noted that in a different embodiment, the most significant bits (and hence, lighting routine index 0 620A) of LT register 440 are on the left hand side of the register.

Although the system and method of the present invention has been described in connection with the described embodiments, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A graphics accelerator for performing lighting calculations on a first polygon, said graphics accelerator comprising:
   an input buffer for receiving attributes corresponding to said first polygon;
   a register for storing a table of light source parameters corresponding to a plurality of light sources;
   an index storage location configured to store a plurality of index values including a first index value, wherein each index value corresponds to one of the plurality of light sources and provides information as to whether the corresponding light source is used, wherein said first index value is indicative of a first lighting routine to be performed on said first polygon using a first light source;
   wherein said plurality of index values provide one or more of the following: an indication that the corresponding light source is not used, an indication that the corresponding light source is directional, an indication that the corresponding light source is infinite, and an indication that there are no additional lights;
   an execution unit configured to access a current index value from said index storage location, wherein said current index value is said first index value, and wherein said execution unit is configured to update said current index value to a second index value within said plurality of index values stored in said index storage location, wherein said second index value is indicative of a second lighting routine to be performed on said first polygon using a second light source; and
   wherein said execution unit is further configured to perform said first lighting routine upon said first polygon using said first light source.

2. The graphics accelerator of claim 1, wherein said execution unit is configured to generate a first intermediate color value for said first polygon in response to performing said first lighting routine upon said first polygon.

3. The graphics accelerator of claim 1, wherein said execution unit is configured to perform a plurality of lighting routines upon said first polygon using the plurality of corresponding light sources, wherein said plurality of lighting routines are specified by the plurality of index values within said index storage location, and wherein said execution unit is configured to generate a plurality of intermediate color values by performing said plurality of lighting routines upon said first polygon, wherein said plurality of intermediate color values are usable to generate a final color value for said first polygon.

4. The graphics accelerator of claim 3, wherein said final color value corresponds to a first vertex of said first polygon.

5. The graphics accelerator of claim 1, wherein said execution unit is configured to perform said first lighting routine in response to accessing said first index value.

6. The graphics accelerator of claim 1, wherein said execution unit is further configured to access said second index value from said index storage location as said current index value, and wherein said execution unit is still further configured to perform said second lighting routine on said first polygon using said second light source.

7. The graphics accelerator of claim 6, wherein said execution unit is configured to perform said second lighting routine in response to accessing said second index value.

8. The graphics accelerator of claim 7, wherein said first index value and said second index value both point to a same lighting routine within said lighting routine storage.

9. The graphics accelerator of claim 1, wherein said light source parameters are selected from the following: light direction, half vector, diffuse light color, and specular color.

10. The graphics accelerator of claim 1, wherein said first lighting routine models said first light source as an infinite light source.

11. The graphics accelerator of claim 1, wherein said first lighting routine models said first light source as a directional light source.

12. The graphics accelerator of claim 1, wherein said execution unit is configured to update said current index value within said index storage location from said second index value to a third index value, wherein said third index value is indicative of a third lighting routine to be performed on said first polygon using a third light source.

13. The graphics accelerator of claim 1, wherein said execution unit is configured to perform a first instruction, wherein execution of said first instruction includes accessing said index storage location and updating said current index value.

14. A method for performing lighting calculations on a polygon in a graphics system, said method comprising:
   assembling a table of light source parameters corresponding to a plurality of different light sources;
   assembling a lighting map for the polygon, wherein the lighting map comprises one or more index values, wherein each index value corresponds to one of said light sources;
   accessing a first index value from said lighting map, wherein said first index value is indicative of a first lighting routine to be performed on the polygon using a first set of light source parameters from said table;
   wherein said first index value provides one or more of the following: an indication that the corresponding light source is not used, an indication that the corresponding light source is directional, an indication that the corresponding light source is infinite, and an indication that there are no additional light; and performing said first lighting routine on the polygon.

15. The method of claim 14, further comprising:

accessing a second index value from said lighting map, wherein said second index value is indicative of a second lighting routine to be performed on the polygon; and performing said second lighting routine on the polygon.

16. The method of clam 15, wherein said method further comprises accessing and updating a pointer, wherein said pointer indicates the current index value in said lighting map.

17. The method of claim 16, further comprising initializing said pointer to point to said first index value.

18. The method of claim 16, further comprising executing an instruction, wherein execution of said instruction includes said accessing and said updating.

19. The method of claim 15, further comprising calculating an intermediate color value corresponding to each of said plurality of light sources, wherein each said intermediate color value is usable to generate a final color value, wherein said final color value corresponds to a first vertex of the polygon.

20. The method of claim 15, wherein said first lighting routine and said second lighting routine are identical.

21. The method of claim 15, wherein said first lighting routine models said first light source as a first infinite light source or a first directional light source.

22. The method of claim 21, wherein said second lighting routine models said second light source as a second infinite light source or a second directional light source.

23. The method of claim 21, further comprising updating said pointer to point from said second index value to a third index value, wherein said third index value is indicative of a third lighting routine to be performed on the polygon using a third light source.

24. The method of claim 15, further comprising copying data from a first entry in said table of light source parameters to a second entry in said table of light source parameters.

25. The method of claim 15, further comprising copying said first index value in said lighting map to said second index value in said lighting map.

26. The method of claim 15, further comprising:

receiving an interrupt request; and performing a specular power function calculation during said performing said first lighting routine in response to said interrupt request.

27. The method of claim 26, wherein said performing said specular power function calculation is performed subsequent to said performing said first lighting routine and prior to said performing said second lighting routine.

28. The method of claim 14, wherein said first lighting routine is performed in response to accessing said first index value.

* * * * *

UNITED STATES PATENT AND TRADEMARK OFFICE
CERTIFICATE OF CORRECTION

PATENT NO. : 6,016,149
DATED : January 18, 2000
INVENTOR(S) : Wayne MOrse

It is certified that error appears in the above-identified patent and that said Letters Patent is hereby corrected as shown below:

Claim 16, col. 15, line 11, please delete "clam" and substitute --claim--.

Signed and Sealed this

Third Day of October, 2000

*Attest:*

Q. TODD DICKINSON

*Attesting Officer*   *Director of Patents and Trademarks*